July 30, 1968

A. MALAQUIN 3,395,341

METHOD AND APPARATUS FOR DETECTING THE VELOCITY OF MOVING
METALLIC MASSES BY MEANS OF PHASE-DISPLACEMENTS
PRODUCED IN MAGNETIC WINDINGS

Filed Jan. 11, 1965

A. MALAQUIN 3,395,341

METHOD AND APPARATUS FOR DETECTING THE VELOCITY OF MOVING
METALLIC MASSES BY MEANS OF PHASE-DISPLACEMENTS
PRODUCED IN MAGNETIC WINDINGS

Filed Jan. 11, 1965

July 30, 1968  A. MALAQUIN  3,395,341
METHOD AND APPARATUS FOR DETECTING THE VELOCITY OF MOVING
METALLIC MASSES BY MEANS OF PHASE-DISPLACEMENTS
PRODUCED IN MAGNETIC WINDINGS
Filed Jan. 11, 1965  4 Sheets-Sheet 4

3,395,341
METHOD AND APPARATUS FOR DETECTING THE VELOCITY OF MOVING METALLIC MASSES BY MEANS OF PHASE-DISPLACEMENTS PRODUCED IN MAGNETIC WINDINGS

Andre Malaquin, Paris, France, assignor to Société Industrielle de Liaisons Electriques, Paris, France, a company of France Filed Jan. 11, 1965, Ser. No. 424,688
Claims priority, application France, Jan. 15, 1964, 960,335; Dec. 31, 1964, 535 (addition)
15 Claims. (Cl. 324—70)

ABSTRACT OF THE DISCLOSURE

A method and device for detecting moving metallic masses wherein two magnetic fluxes of the same frequency and magnitude are received in phase-opposition by a pick-up device, no electromotive force being produced in the pick-up device in the absence of a metallic mass. The presence of a metallic mass unbalances the magnetic flux received by the pick-up device and induces an electromotive signal therein. The signal is amplified to obtain a constant amplitude resultant pick-up signal, the phase-shift produced between the constant amplitude resultant pick-up signal and a variable phase reference signal being compared by a phase comparator. An output signal is provided from the phase comparator when the phase-shift measured therein reaches a predetermined threshold value. Through suitable interpretation of the output signal, both the speed and direction of travel of the metallic mass can be determined.

---

This invention relates to a method and a device for detecting the passage and/or the presence of a moving body in a particular region and more precisely the passage and/or presence of a metallic mass.

For many purposes, it is useful to detect, not only the passage but also the direction of motion of such passage and possibly, the velocity of the moving body. This is particularly the case with railway operation for which the invention is preferentially but not exclusively intended.

Numerous such detection devices are already known, functioning by mechanical or electromagnetic means which are used, for instance, for axle counting, automatic train announcing, controlling railway signals, and the like.

The hitherto known, magnetic or electromagnetic devices of this kind generally incorporate a magnetic circuit arranged in the vicinity of a trackrail, the reluctance whereof is modified by the passage of a train, for instance by the air gap being bridged by the passage of a wheel flange. In such arrangements, the passage of the metallic mass is detected by the voltage induced in a winding inductively connected with the inductor of the magnetic circuit.

However, the intensity and diversity of the magnetic fields, whether D.C. or of mains frequency, present in the neighbourhood of a railway line, impairs the reliability of detection devices using D.C. or mains frequency magnetic fields. Actually, the most serious danger in such known devices, results from the fact that detection is founded on measuring the amplitude of an emitted signal, and, more generally, on measuring the induced voltage in a pick-up coil.

The device according to the invention similarly uses the variation of the reluctance (which may result from the change in permeability or the losses in the controlled region), caused in a magnetic circuit by the passage of the metallic mass to be detected; but the amplitude of the signal induced in response to these variations, does not influence the detection, so that errors which may result from the greater or lesser mass of the moving body, its more or less identical position or attitude during successive passages, etc., do not in any way affect the process of detection.

The method according to the invention makes use, for detecting the change in reluctance produced in a magnetic circuit adjacent to the path of a moving body, by the passage or presence of the latter of a phase-comparison between the voltages tapped on the one hand at the terminals of a pick-up element and on the other hand at the terminals of an emitter element, both of which are inductively linked.

The present invention provides a method of detecting the presence and/or the passage of a metallic mass through a predetermined region consisting in exposing an electro-magnetic pick-up device having not less than one detector coil, within such region to alternating magnetic fluxes of identical frequency which in the absence of such a mass generate at the terminals of the said pick-up arrangement a resultant electromotive force of zero value; varying, by the effect of the passage and/or presence of the said metallic mass, the reluctance of at least one of the magnetic circuits derived from one of the said fluxes; and comparing the phase-shift produced between, on the one hand the resultant induced electromotive force, now no longer of zero value, in the aforesaid pick-up device, due to the aforesaid change in reluctance; and on the other hand, at least one of the alternating voltages generating the aforesaid fluxes.

In order to obtain in the absence of such a mass to be detected, a zero resultant electromotive force at the terminals of the pick-up element, the aforesaid pick-up element can be influenced by two equal, but normally phase-opposed fluxes in such manner as to produce a zero induction flux. Alternatively, the said device may be influenced by two, equal and normally in phase fluxes, each of which influence a separate pick-up coil. In that case, the receiver element is formed by linking these two coils in opposition, so that the resultant voltage at the terminals of the device, is zero in the absence of a moving body to be detected.

Thus, in accordance with a first embodiment of the present invention, the method consists of: exposing the pick-up coil to two alternating magnetic fluxes of identical frequency which are equal and phase-opposed in the absence of a metallic mass to be detected; modifying, by the passage of the aforesaid metallic mass, the reluctance of at least one of the magnetic circuits deriving from one of the said fluxes, and comparing the phase-shift then existing between the electromotive force induced by one of the said fluxes in such coil by the said modification of its reluctance on the one hand, with at least one of the alternating voltages on the other hand, generating the aforesaid fluxes.

In accordance with a second embodiment of the invention, the method consists in: exposing two pick-up coils connected in opposition, to two alternating fluxes of the same frequency which in the absence of a mass to be detected, are equal and in phase, by means of two, pick-up poles associated with the said coils; modifying the reluctance value by the passage of the moving body to be detected; comparing the phase-shift existing between electromotive force induced in the two, oppositely-connected coils, with the generating voltage of one of the said fluxes.

The present invention also provides apparatus for detecting the presence and/or the passage of a metallic mass in a predetermined region comprising a first and a second magnetic flux emitter supplied with an alternating voltage of identical frequency and arranged respectively at the entry and exit of the said region; the said apparatus further comprising a pick-up device arranged between the said emitters and inductively coupled therewith which is normally subjected by the said emitters in the absence of the said mass, to two equal fluxes generating at the terminals of the said pick-up device a zero resultant electromotive force, each emitter forming with the said pick-up device an open magnetic circuit the reluctance whereof is modified by the presence of the said metallic mass, the said apparatus further incorporating the means for comparing the phase-displacement between on the one hand the resultant electromotive force induced in the said pickup element by one of the said fluxes becoming predominant under the influence of the said modification of the reluctance and on the other hand the aforesaid alternating voltage.

Preferentially, the two flux generators or emitters are supplied from a common source with an alternating voltage; the said emitters being connected at will, either in series or in parallel.

In accordance with a second embodiment of apparatus according to the present invention, the aforesaid receiver arranged between the two emitters and inductively coupled therewith, comprises two coils connected in opposition, which are normally subjected by the said emitters and in the absence of a disturbing mass to be detected, to the influence of two fluxes of identical value and phase, each flux emitter forming with each receiver coil, an open magnetic circuit the reluctance whereof can be modified by the presence of a disturbing mass as aforesaid. In such case, it is sufficient to measure the phase-shift between the resultant electromotive force induced in the two coils by the one flux, and at least one of the aforesaid alternating voltages.

It will thus be seen that, according to the invention, the information indicating the passage or the presence of a mass to be detected, is independent of the amplitude of the pick-up voltage. Similarly, the direction of passage of the moving object can be easily distinguished due to the fact that the measured phase-shift will be advanced or retarded, depending on whether the moving body is travelling in the one or the other direction, through the pick-up region. On the other hand, the information recorded, is independent of the upply frequency applied to the emitters, over a very wide frequency range; this frequency being freely selectable to avoid the disturbances introduced by the stray variable fields which usually exist in the vicinity of railway lines, without such selected frequency requiring to be defined with any stable precision.

On the other hand, in the case that the receiver is formed of two, oppositely connected coils, the arrangement will be insensitive to any parasitic, magnetic induction.

Embodiments of the present invention will now be described, by way of example, with reference to the accompanying drawings, in which.

Figure 3:
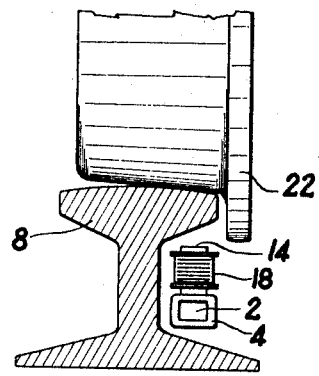
FIG. 3 represents in vertical section, a further embodiment in accordance with the invention.
Figure 4:
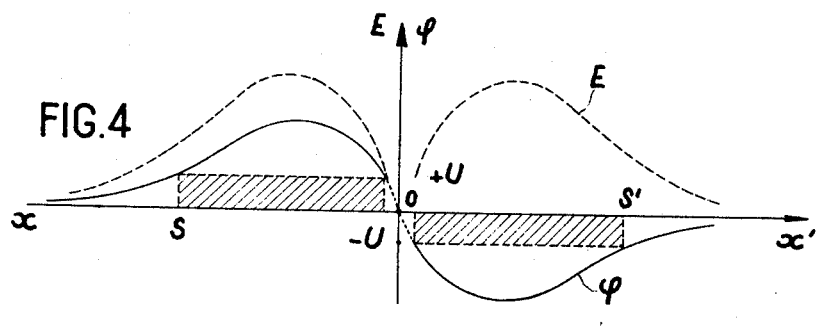
FIG. 4 is a graph of the phase-changes referred to the instant of passage of a moving body through the pick-up region.
Figure 5:
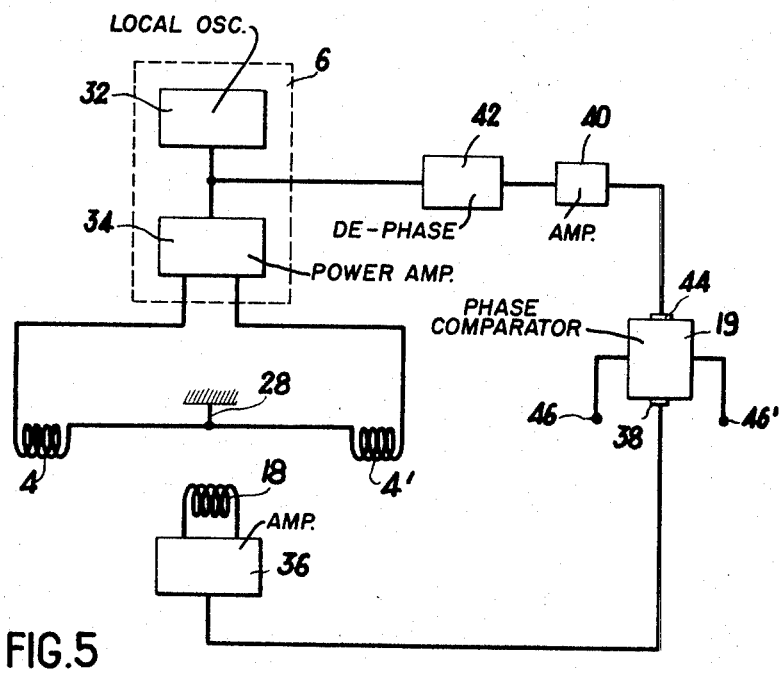
FIG. 5 shows a feeder and pick-up circuit arrangement for the embodiment shown in FIG. 1.
Figure 8:
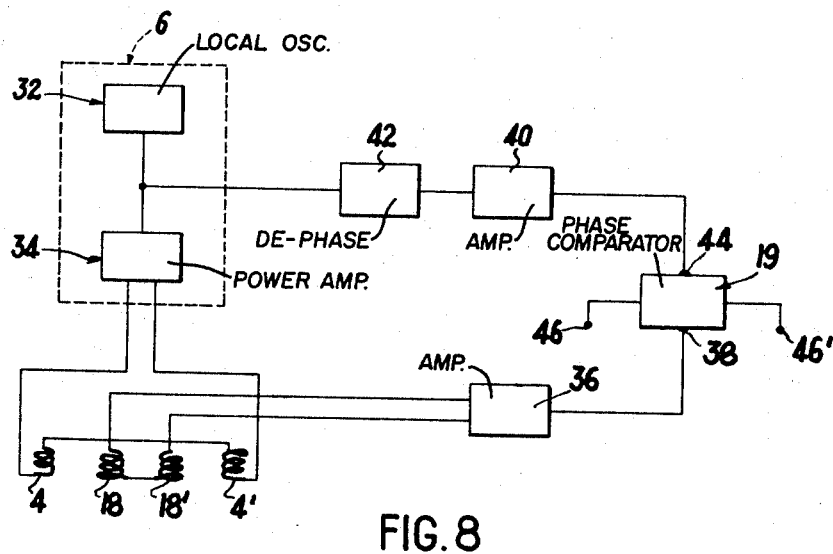
FIG. 8 represents the feeder and pick-up circuit arrangement for apparatus in accordance with FIG. 7.
Figure 9:
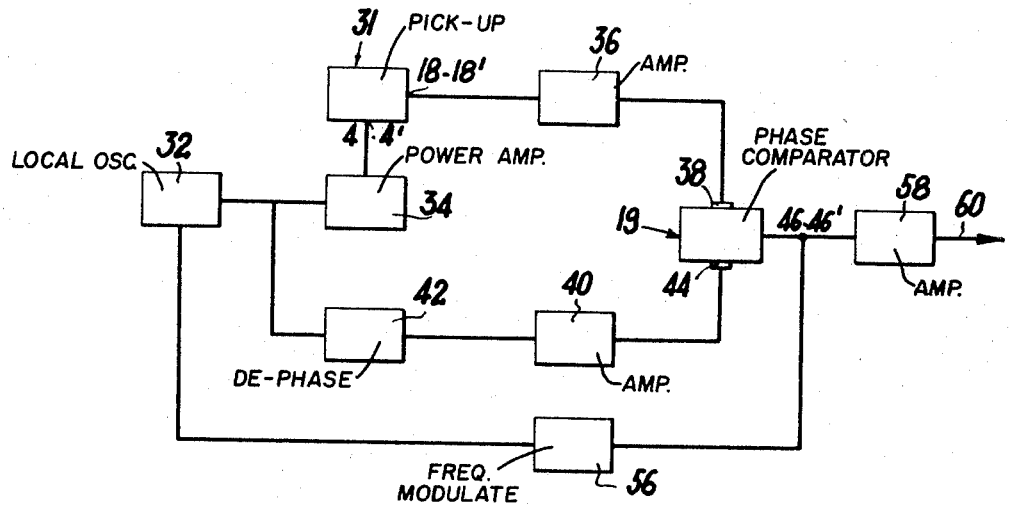
Figure 10:
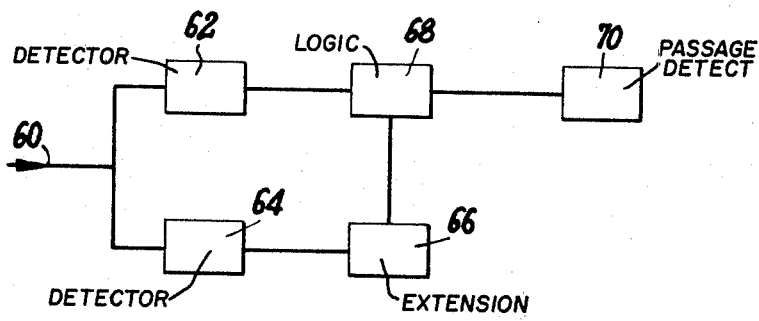

FIG. 9 shows in greater detail than in FIG. 5 and 8, the electric circuits for interpreting the information supplied by the apparatus; and FIG. 10 shows the receiving element of the information transmitting circuit for the embodiment shown in FIGS. 1 to 5, in which the invention is applied to detecting the passage of a railway train, the cancellation of the electromotive force measuring across the terminals of the pick-up system in the absence of a moving body, is produced by two, equal and phase-opposed flux components acting on a single pick-up coil.

The apparatus comprises two, symmetrical inductor poles 2–2', carrying two coil windings 4–4', or emitters, supplied in series or in parallel by an alternating voltage source 6, having a frequency higher than all the frequencies which may occur in or near a railway track.

The device is arranged longitudinally in the vicinity of the rail 8, by means of an appropriate holder 10.

The windings 4–4' set up fluxes 12–12', which are phase-opposed, and the major part whereof is contained in the rail 8. The inductor poles 2–2' are placed near the ends of the pick-up region, while in the central part of this region, a pick-up pole 14 is arranged through which, in the absence of any moving body, there pass two, equal fluxes 16–16', similarly phase-opposed. A receiver or pick-up winding 18, carried on the pick-up pole 14 will not, consequently, in the absence of any moving body, carry any induced, electromotive force.

A phase-comparator of known kind, diagrammatically indicated at 19, is connected with the terminals 20–20' of a detector or pick-up winding 18, and compares the phase of the voltage induced in this winding, with the phases of at least one of the feeder voltages. This comparator device may incorporate one or more amplifier stages which are not shown, and also a limiter element which be presently described in reference to FIG. 5.

Figure 1:
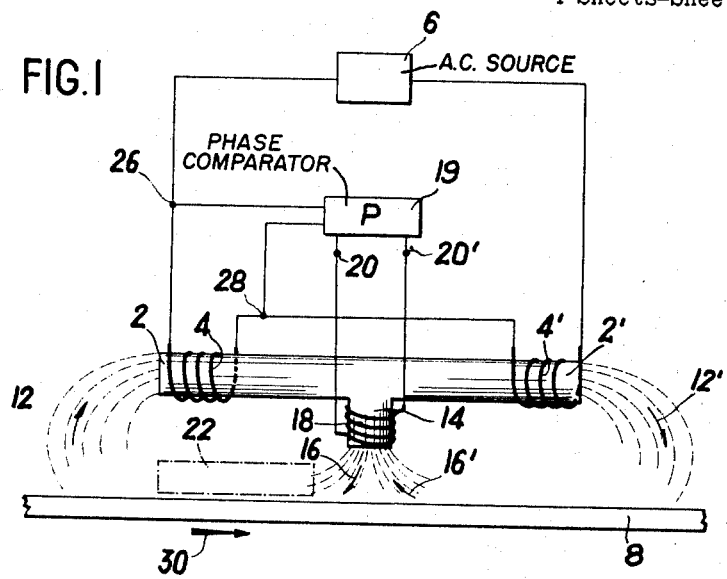
FIG. 1 represents diagrammatically in plan view, one embodiment of the invention.
Figure 2:
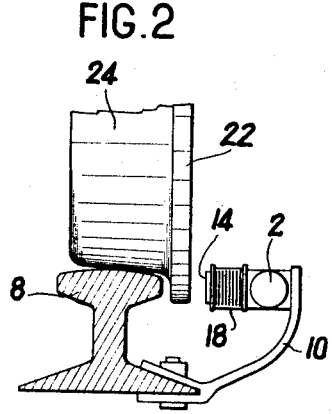
FIG. 2 is a vertical section of the same embodiment.

The magnetic circuit of the arrangement may be in the form of a T, as shown in FIG. 1, or in E-form, and may be placed to one side of the rail 8 (FIGS. 1 and 2) leaving an air-gap through which the flange 22 of a train wheel 24, can pass. In a variant form, the device may be attached against the rail with the pick-up pole 14 arranged vertically, as shown in FIG. 3, or horizontally, or inclined.

When the moving body to be detected, in particular the flange 22 of a wheel 24, shown in broken lines in FIG.1, is moving in the direction 30 and enters the region of action of an inductor pole, for instance the pole 2, it modifies the reluctance of the magnetic circuit associated with this pole, as well as the flux 12–16 in this part of the circuit, when, in the pick-up winding 18, the flux 16 becomes different from the flux 16'.

As a consequence, the resultant flux passing through this winding, is no longer zero, its phase tending to be the same as that of the intercepted inductor pole. Then, an electromotive force will be set up across the terminals 20–20' of the pick-up winding 18, in a phase adjacent to the phase of the voltage subsisting between the terminals 26–28 of the induction winding 4, the magnetic circuit whereof has been intercepted by the flange 22. The measured phase-shift increases from the entry of the wheel flange into the range of action of the inductor pole 2, until the said flange begins also to intercept the flux emitted by the second pole 2'. When the moving body is at the center of the arrangement, it produces a change in the reluctance, identical in both circuits of the two inductor poles, as a consequence of which, the sum of the flux values 16–16' passing through the pick-up windings, becomes zero again: i.e., at this instant, the pick-up windings carry no induced electromotive force.

When the moving body, continuing its course in the direction 30, passes from the zone of influence of the pole 2 into the zone of influence of the pole 2', the reluctance of the magnetic circuit associated with the latter pole, in turn changes. As a result, the part 16' of the flux passing through the windings 18, becomes modified with respect to the component 16, and the windings 18 again carry an induced electromotive force phased nearly identically with the voltage in the winding of the inductor 4', i.e., phase-opposed with reference to the voltage in the inductor winding 4.

The changes in the measured phases are shown in full lines in FIG. 4, against the position of the moving body with reference to the center of the receiving pole 14; while the variations in the pick-up voltage are shown in broken lines. These changes in voltage are not utilized in apparatus according to the invention, but have been included to show clearly that they are symmetrical about the axis of the device, while the phase-changes are inverted when the moving body passes through the axis of the device.

The length of the apparatus is so selected that the reaction time between the moving body and the apparatus is sufficiently long with reference to the period of the magnetic induction field to create in the receiver windings an electromotive force the phase-displacement whereof is sufficiently easily measurable, even should the body be moving at high speed.

Figure 7:
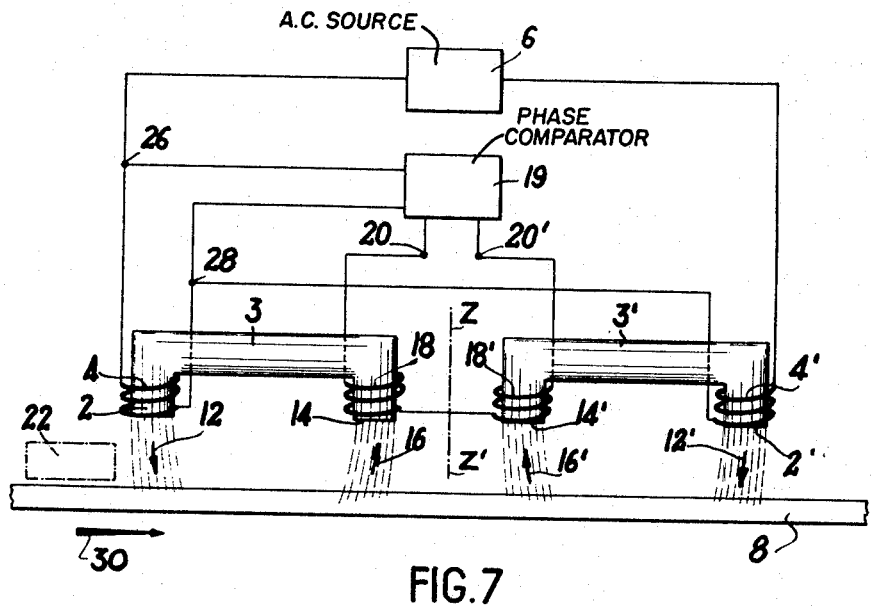
FIG. 7 represents another embodiment of the apparatus in which the pick-up system is composed of two receiving coils.

FIG. 7 shows another form of embodiment of the present invention in which the cancellation of the electromotive resultant force induced in the pick-up system in the absence of a moving body to be detected, is obtained by oppositely connecting two receiving coils each exposed to an equal flux and reciprocally in phase.

In accordance with this form of embodiment, the apparatus comprises two, open magnetic circuits 3–3' which are separate and identical, in the form of a U, arranged along the rail 8. These magnetic circuits respectively incorporate the emitter windings 4–4' fed by the generator 6, which produce fluxes 12–12' in phase with each other.

The opposed poles 14–14' of these two, magnetic circuits, which are located in the central part of the detection or pick-up region, form the pick-up poles which, in the absence of a moving body, carry identically phased, equal flux values 16–16'.

The electric coupling between the two, receiving windings 18–18' mounted on the poles 14–14', is made in opposition, i.e. the individual and identical electromotive forces in each of the windings, identically phased and induced by the fluxes 16–16' produce a zero resultant electromotive force at the terminals 20–20' of the pick-up system; in the absence of a moving body to be detected. As in the case of FIG. 1, these terminals 20–20' are connected with the phase-comparator 19 the other input whereof is connected to the terminals, shown at 26–28, of one of the emitter windings. This device functions in the same manner as described for FIG. 1, and it is sufficient to mention that upon the moving body 22 entering the pick-up zone, the flux 16 becomes different from the flux 16', passing through the receiver or pick-up 18'. Consequently, the resultant voltage induced, is no longer zero, and the comparator 19 will show a phase inversion at the instant the moving body passes through the axis ZZ' of the device.

Whichever of the arrangements according to FIG. 1 or FIG. 7 is used, consequently, the device according to the present invention enables detection of the presence of a metallic mass in the controlled region, and the determination of the position of such mass with reference to the axis ZZ' of the apparatus (the parts Ox or Ox' on the diagram, FIG. 4).

Detection takes place independently of the speed of the moving body and the apparatus thus also enables the detection of fast as well as slow trains.

By virtue of the indicated phase inversion, the direction of passage of the trains can be identified, thus enabling operation such as the counting and checking of the train axles, the control of signalling on railway lines, shunting at stations, and sorting of goods vehicles in marshalling yards.

The device according to the invention also enables the speed of a passing moving body to be determined. Actually, if the phase comparator 19 of the apparatus is connected with a device responding to some threshold value S or S' of the phase-shift (FIG. 4), and the time of passage between the two thresholds is measured, the speed of the moving body can be determined.

The most suitable phase detector is one of the synchronous type. The positive or negative signals emitted by the detector, can be represented by signals of constant amplitude $+U$ or $-U$, released by the passage of a particular, detected signal, through some particular threshold value S.

By the association of conventional logical functions it is possible to evaluate these data $+U$ and $-U$ on the spot or in a central unit in such manner as to deduce the speed of the train from the time interval between the two centers of gravity of the two signals, $+U$ and $-U$.

By virtue of the evaluation of the speed by the device according to the present invention, it is possible to signal the arrival of a train at a predetermined point, for instance before a level crossing, the train being signalled at the same time interval in advance, whatever its speed.

Finally, the evaluation of the train speed allows of a rejecting device being incorporated which ignores signals referring to a moving body travelling at less than a predetermined speed in such manner as to release the arrival signal only on a particular speed being attained.

FIGS. 5 and 8 show one embodiment of the feeder and measuring circuits in detection devices respectively conforming to the arrangements shown in FIGS. 1 and 7. The alternating-voltage generator 6 can incorporate a local oscillator 32 followed by a power amplifier 34 which feeds the two windings 4–4' (the central point 28 whereof may be earthed, as shown in FIGS. 1 and 5).

The frequency of the local oscillator 32 may be of the order of 8 to 50 kc./s., for the most usual forms of application.

The voltages induced in the winding or windings of the pick-up units 18 or 18–18', are stepped up in a measuring limit amplifier 36 supplying a constant output level, which is coupled with one of the inputs 38 of the phasemeter 19.

In addition, the local oscillator 32 feeds an amplifier 40 supplying a phase-reference signal, which is preceded by a dephasing circuit 42 receiving a sinusoidal signal and enabling phase-adjustment for calibrating the apparatus before fitting in place.

The amplifier 36 receiving the pick-up voltage incorporates a limiting device in such manner that the output voltage is independent of the applied input voltage, which makes it possible to eliminate variations in the pick-up due either to differences in bulk or shape of the moving body or of its relative position with reference to the detecting device (wheel diameter, tire cross-section, hunting or nosing movements, slight shifting of the pick-up heads, etc.).

The output signal of the amplifier 36 is of sinusoidal or rectangular form, due to the action of the aforesaid limiter. The amplifier 40 is equipped with a similar device in such manner that the phase-detector compares two signals of the same form and amplitude. The signals generated by the phase-detector in response to the phase-displacements indicating the presence or passage of a metallic mass, are received at the terminals 46–46' and applied to a circuit not shown, where these signals are evaluated for counting, signalling etc., of the trains.

This circuit may be located elsewhere than at the pick-up point. It then becomes necessary to convert the data received at the terminals 46–46' for further transmission. To smooth all fluctuations introduced by the conductors or the parasitic electrical or magnetic effects which may occur, the change in the voltage received at the terminals 46–46' is converted into changes in the frequency of an oscillator. If $F_0$ is the frequency of the oscillator in the absence of interaction, the passage of a metallic mass through the region of influence of the pick-up will for instance furnish a frequency $F_0+\Delta F$ on approach to one end, and $F_0-\Delta F$ on approach to the other end.

The block diagram in FIG. 9 shows the combination of conventional functions attaining this object, with the aid of a frequency modulator 56 and an amplifier 58, transmitting the information to the two-wire conductor 60, the latter simultaneously providing the continuous remote power supply for all these circuits.

In this diagram the pick-up arrangement itself is denoted by the general reference 31 and may comprise for example, as shown in FIG. 7, two emitter windings 4—4' and two receiver windings 18—18'.

At the other end of the line, are arranged:

1. Restoring circuits for the initial signal obtained at the terminals 46–46' of the phase detector 19.

2. Evaluating circuits for the information, enabling the detector to be made directional, i.e., acting in a particular direction of passage of the mass to be detected.

A passage of this mass in the direction $xx'$ of FIG. 4 will for instance give at the terminals 46–46' of the phase detector, a voltage E which will at first be positive from $x$ towards 0, then negative from 0 towards $x'$. The information of a passage can be given either by appearance of the positive value of this tension sign, or of the negative value. To discriminate between the directions of passage in such an arrangement, it must be made dead when transversed in the opposite direction. The means for this purpose consist of coding the information of the passage by the order of succession of the signal of the voltage detected. In the example mentioned above, the information of a passage can be given by the appearance of the negative value of the voltage set up at the terminals 46–46' of the phase discriminator 19, which will then be preceded by the appearance of the positive value of the said voltage.

The various circuits grouped at the other end of the line 60, for this purpose, are shown diagrammatically in FIG. 10.

The signal received by the line 60 is sent simultaneously to the two, selective detectors 62 and 64 respectively tuned to $F_0-\Delta F$ and $F_0+\Delta F$. These detectors will furnish, when a body passes the pick-up element, signals synchronising with those obtained at the terminals 46–46' of the phase detector 19. The signal emitted by the detector 62 may, for instance, correspond to the negative value of the phase-detector tension, and that from the detector 64, to the positive value thereof. By introducing in series with the latter, an extension circuit 66 having the purpose of maintaining this signal for a time interval proportional to its duration, it is possible to release the passage signal for the direction $xx'$, if the signals are emitted simultaneously by the circuits 62 and 66, thereby detecting their superposition by a logical circuit "ET" 68 the output signal whereof will actuate the passage-detection element 70.

If the direction of passage is from $x'$ towards $x$, the signals emitted by the circuits 62 and 66 will not be superposed and the passage-detector element will be inactive.

In the preceding, principally the applications of the device in railway operation, have been discussed: but it may equally be used for detecting other metallic masses, for instance sorting or classifying metallic material or other materials with magnetic properties, by their active frequencies, for controlling the passage or the presence of motor vehicles, etc.

Figure 6:
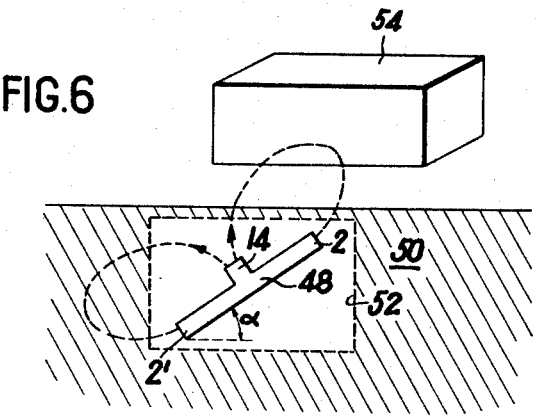
FIG. 6 illustrates apparatus for detecting the presence of a motor vehicle in a parking area.

FIG. 6 shows diagrammatically apparatus according to the invention for detecting the presence of motor vehicles in a parking area. A device 48 is buried in the ground 50 inside a box 52, at each parking place, and all data can be concentrated at a central control station, showing the parking places free or occupied at any instant. In this embodiment, the magnetic circuit of the device 48 is inclined at an angle $\alpha$ (e.g. of the order of 25 to 45°) to the horizontal, in such manner that a vehicle 54 can only intercept the flux emitted by one of the poles of the apparatus (e.g., pole 2). If a vehicle is parked, whatever its position, the fluxes traversing the pick-up pole 14 cannot balance in the same manner as in FIG. 1 during passage of a wheel flange 22 in front of the pick-up pole.

Of course, the invention is in no way restricted to the forms of embodiment described and represented but can be modified in many ways open to anyone skilled in the art, according to the intended applications and without thereby exceeding the scope of the invention.

Thus, according to a particular variant, a symmetrical, open magnetic circuit can be used, such as shown in FIG. 1, having two, induction coils 4–4', but in which the central, pick-up pole 14 has not got a pick-up winding. In this case, the phase-meter 19 is connected between the first inductor winding 4 and the second inductor winding 4', the phase-displacement between these two windings changing when the moving body to be detected successively modifies the reluctance of the magnetic circuit of one of the induction coils and successively the magnetic circuit of the other induction coil.

I claim:

1. A method of detecting the velocity of a metallic mass through a predetermined region consisting in exposing an electromagnetic pick-up device having not less than one detector coil within such region to at least two alternating magnetic fluxes produced by at least two magnetic circuits, said magnetic fluxes being of identical frequency which in the absence of such a mass generate at the terminals of the said pick-up arrangement a resultant electromotive force of zero value; varying, by the effect of the passage of the said metallic mass through said predetermined region, the reluctance of at least one of said magnetic circuits producing one of said alternating magnetic fluxes whereby a varying phase resultant induced electromotive force is produced in said pick-up device; amplifying and limiting said resultant induced electromotive force in said pick-up device due to said change in reluctance to obtain a constant amplitude varying phase resultant pick-up signal; comparing the phase of said constant amplitude resultant pick-up signal with an adjustable phase reference signal; and providing an output signal only when the phase-shift between said pick-up signal and said reference signal reaches a threshold value, whereby velocity of said metallic mass through said predetermined region can be determined from the time of occurrence of said output signal.

2. A method of detecting the velocity of a metallic mass as claimed in claim 1, in which said at least two alternating magnetic fluxes of the same frequency are equal in magnitude and phase-opposed in the absence of said metallic mass, by virtue whereof said resultant electromotive force induced in said pick-up element is normally zero.

3. A method of detecting the velocity of a metallic mass as claimed in claim 1, wherein said at least two, alternating magnetic fluxes of identical frequency acting on said pick-up element are in phase in the absence of a metallic mass; and wherein the said pick-up device comprises at least two windings respectively influenced by the said at least two fluxes and electrically coupled in opposition by virtue whereof said resultant induced electromotive force is zero in the absence of the mass.

4. A method of detecting the velocity of a metallic mass as claimed in claim 3, wherein said at least two magnetic fluxes of the same frequency are of identical magnitude and phase.

5. Apparatus for detecting the velocity of a metallic mass in a predetermined region comprising a first and a second magnetic flux emitter supplied with an alternating voltage of identical frequency and arranged respectively at the entry and exit of the said region; the said apparatus further comprising a pick-up device arranged between the said emitters and inductively coupled therewith which is normally subjected by the said emitters in the absence of the said mass, two equal fluxes normally generating at the terminals of the said pick-up device a zero resultant electromotive force, each emitter forming with the said pick-up device an open magnetic circuit the reluctance whereof is modified by the passage of the said metallic mass through said predetermined region, said pick-up device producing a varying phase reluctant induced electromotive force in response to said change in reluctance when a metallic mass passes through said predetermined region, the said apparatus further incorporating means for providing a constant amplitude varying phase resultant pick-up signal from said resultant electromotive force induced in said pick-up device, means for providing an adjustable phase reference signal from said alternating voltage, means for comparing the phase of said constant amplitude resultant pick-up signal with said adjustable phase reference signal, and means for producing an output signal only when the phase-displacement between said pick-up signal and said reference signal reaches a threshold value whereby velocity of said metallic mass through said predetermined region can be determined from the time of occurrence of said output signal.

6. Apparatus as claim in claim 5, wherein said pick-up device comprises a receiver winding in which said two, magnetic fluxes generated by said emitters and which pass through said winding are equal and phase-opposed in the absence of a mass to be detected.

7. Apparatus as claimed in claim 5, wherein said pick-up device comprises two receiver windings respectively influenced by each of said fluxes; wherein said fluxes are equal and in phase in the absence of a mass to be detected; and in which the said receiver windings are electrically connected in operation.

8. Apparatus as claimed in claim 5, wherein each of said emitters and said pick-up device forms a U-shaped magnetic circuit.

9. Apparatus as claimed in claim 5, further comprising an open, symmetrical magnetic circuit arranged parallel and adjacent to a track rail for a train, said magnetic circuit including a magnetic core having at opposite ends thereof two inductor poles each carrying a flux-emitting winding supplied with an alternating tension and having at a central portion thereof a pick-up pole carrying a receiver winding.

10. Apparatus as claimed in claim 9, wherein said symmetrical magnetic circuit is T-shaped, the cross-bar of the T being set parallel to said rail.

11. Apparatus as claimed in claim 9, in which said symmetrical magnetic circuit is E-shaped.

12. Apparatus as claimed in claim 9, in which said emitter windings are connected in series and supplied by a common alternating-current source.

13. Apparatus as claimed in claim 5, in which said means for comparing phase-displacements includes a synchronous phase-detector.

14. Apparatus as claimed in claim 5 wherein said means for producing an output signal displacements provides a different output signal according as to whether the phase-shift of said resultant pick-up signal is advanced or retarded with respect to the phase of said phase reference signal by virtue whereof the direction of passage of the moving body can be determined.

15. Apparatus as claimed in claim 5, including means for measuring the time elapsed between two successive output signals.

References Cited

UNITED STATES PATENTS 2,532,231  11/1950  Jarvis _____ 340—38

FOREIGN PATENTS 1,230,515  4/1960  France.
1,274,619  9/1961  France.

RUDOLPH V. ROLINEC, *Primary Examiner.*

R. J. CORCORAN, *Assistant Examiner.*